(12) United States Patent  (10) Patent No.: US 8,320,031 B1
Sox et al.  (45) Date of Patent: Nov. 27, 2012

(54) METHOD FOR REAL TIME HOLOGRAPHIC FRINGE BLAZING BY DETERMINING ADJACENT FRINGE MINIMA AND BLAZING INTERMEDIATE THE MINIMA

(75) Inventors: Daniel J. Sox, Redondo Beach, CA (US); Dennis M. Guthals, Thousand Oaks, CA (US); Blair F. Campbell, Chatsworth, CA (US); Margarita A. Carbon, Calabasas, CA (US)

(73) Assignee: The Boeing Company, Chicago, IL (US)

( * ) Notice: Subject to any disclaimer, the term of this patent is extended or adjusted under 35 U.S.C. 154(b) by 382 days.

(21) Appl. No.: 12/635,698

(22) Filed: Dec. 10, 2009

(51) Int. Cl.
*G03H 1/08* (2006.01)
(52) U.S. Cl. ............... 359/9; 359/15; 250/201.9
(58) Field of Classification Search .......... None
See application file for complete search history.

(56) References Cited

U.S. PATENT DOCUMENTS

| | | | |
|---|---|---|---|
| 5,085,502 A * | 2/1992 | Womack et al. ............ 356/605 |
| 5,148,323 A | 9/1992 | Campbell et al. |
| 5,258,860 A | 11/1993 | Schehrer et al. |
| 5,402,234 A * | 3/1995 | Deck ........................ 356/497 |
| 6,147,764 A * | 11/2000 | Handa ....................... 356/512 |
| 6,856,397 B2 * | 2/2005 | Huston et al. .............. 356/450 |
| 7,505,138 B2 | 3/2009 | Guthals et al. |

OTHER PUBLICATIONS

M.A.Carbon, D.M.Guthals, J.D.Logan, Wave-Optics Modeling of Real-Time Holographic Wavefront Compensation Systems Using OSSim, in: Advanced Wavefront Control Methods, Devices, and Applications III, edited by M.T.Gruneisen, J.D. Gonglewski, M.K. Giles, Proc. SPIE vol. 5894, 5894131-7 (2005).

* cited by examiner

*Primary Examiner* — Arnel C Lavarias
(74) *Attorney, Agent, or Firm* — Felix L. Fischer

(57) ABSTRACT

Blazing of real time holographic fringes employs an interferometer with a focal plane array (FPA) to receive interference fringes. An FPA frame is read into a fringe processor. For each row, minima are identified and a pixel value is saved and its position in the row recorded. The minima determination is repeated for each column in the row until all pixels in the row have been recorded. A blazed fringe for the single row is then created. The blazed fringe row is then transferred to a spatial light modulator (SLM). The minima determination and fringe blazing processes are repeated until all rows in the FPA array are read and transferred to the SLM. The next FPA frame is then read into the fringe processor.

15 Claims, 7 Drawing Sheets

METHOD FOR REAL TIME HOLOGRAPHIC FRINGE BLAZING BY DETERMINING ADJACENT FRINGE MINIMA AND BLAZING INTERMEDIATE THE MINIMA

REFERENCE TO RELATED APPLICATIONS

This application is copending with application Ser. No. 12/635,689 filed. Dec. 10, 2009 by inventors Margarita A. Carbon and Dennis M. Guthals entitled Coherent Beam Combining Using Real Time Holography and having, application Ser No. 12/635,691 filed Dec. 10, 2009 by inventors Daniel J. Sox, Dennis M. Guthals, Margarita A. Carbon and Blair F. Campbell entitled Incoherent Beam Combining of Parallel Beams with Optical Path Compensation Using Real Time Holography and having application Ser. No. 12/635,696 filed Dec. 10, 2009 by inventors Daniel J. Sox, Dennis M. Guthals, Margarita A. Carbon and Blair F. Campbell entitled Incoherent Spectral Beam Combining with Optical Path Compensation Using Real Time Holography, each of which is incorporated herein by reference as though fully set forth.

BACKGROUND INFORMATION

1. Field

Embodiments of the disclosure relate generally to the field of optical systems for laser transmission and more particularly to embodiments to combine multiple laser sources using a self-referenced interferometer generated hologram of the optical path to the target to remove optical path aberrations and improving the hologram by making the fringe transfer and blazing for high optical efficiency very insensitive to fringe contrast and intensity fluctuations.

2. Background

Combining of multiple laser beams provides for increased power and other desired characteristics. Current approaches for combination of beams require separate beam control or adaptive optics for each laser beam. Such existing solutions combine the beams with a static grating, requiring separate wavefront control on each laser and do not add the benefit of adaptive optics to also compensate for the path to the target. Additionally very precise piston, tip and tilt tolerances are required in the beam control system and optical trains to maintain the beams within the alignment ranges of the control loops. Existing solutions combine the beams with active steering systems for each beam using a static grating requiring separate piston, tip, and tilt control on each sub-aperture and do not add the benefit of adaptive optics to also compensate for the path to the target. Optical systems which maintain the required high tolerances are complex and expensive. Additionally, conventional adaptive optical devices and controls are fragile and require constant tuning therefore becoming impractical for fieldable systems.

To improve adaptive optics, generation of real time holograms as diffraction gratings may be employed. Interference fringes used to create the holograms may employ blazing for improved performance. The conventional fringe blazing approach involves guessing at a fringe intensity threshold and applying the threshold to all pixels in a row across fringes. The pixels are then binarized (above threshold=1, below threshold=0) and binarized fringes are created by assuming one wave between fringes to generate a high optically efficient stepped blazed grating for transfer to an electrically addressed spatial light modulator for real time hologram beam projection or image compensation applications. This approach is very sensitive to the initial threshold intensity guess and is very sensitive to changes in intensity caused by atmospheric turbulence scintillation, and unbalanced signal and reference leg power levels caused by pinhole losses in the reference leg.

It is therefore desirable to provide a laser beam control system which reduces complexity, size, weight, and power, reduces the adaptive optics requirements to reduce cost while improving far field beam quality and improves blazing of hologram fringes for increased performance.

SUMMARY

Exemplary embodiments provide a method for blazing of real time holographic fringes which employs an interferometer with a focal plane array (FPA) to receive interference fringes. An FPA frame with L rows and N columns of data is read into a fringe processor. For each row, an n-pixel bucket having an odd number of pixels in column data points is placed in the row at the first column. A determination is made if the central point in the bucket is a local minima. If so, that pixel value is saved and its position in the row recorded. The bucket is then shifted by one pixel. The minima determination is repeated for each column in the row until all pixels in the row have been covered by the bucket. A blazed fringe for the single row is then created with $\lambda/m$ steps per fringe where m is the number of pixels between minima and is the wavelength of the beam. The blazed fringe row is then transferred to a spatial light modulator (SLM). The minima determination and fringe blazing processes are repeated until all Louwm in the FPA array are read and transferred to the SLM as a real time hologram (RTH). The next FPA frame is then read into the fringe processor, Edge fringe estimations are employed for enhanced fidelity at the edges of the WITH to reduce loss in full aperture grating area.

A first exemplary embodiment provides a method for combining multiple coherent optical beams by propagating a plurality of coherent beamlets through a collimating lens to fill an aperture and separating a sample of the output of the combined beamlets to an interferometer. The combined beamlet and sample are interfered to form interference fringes on a focal plane array in the interferometer. An FPA frame with L rows and N columns of data is read into a fringe processor. For each row, an n-pixel bucket having an odd number of pixels in column data points is placed in the row at the first column. A determination is made if the central point in the bucket is a local minima. If so, that pixel value is saved and its position in the row recorded. The bucket is then shifted by one pixel. The minima determination is repeated for each column in the row until all pixels in the row have been covered by the bucket. A blazed fringe for the single row is then created with $\lambda/m$ steps per fringe where in is the number of pixels between minima and $\lambda$ is the wavelength of the beam. The blazed fringe row is then transferred to a spatial light modulator (SLM). The minima determination and fringe blazing processes are repeated until all L rows in the FPA array are read and transferred to the SLM. The next FPA frame is then read into the fringe processor. The fringes are then transferred to a SLM to generate a real time hologram. The combined beamlets from the relay optics are then diffracted from the SLM hologram fringes and emitted to the far field with diffractive compensation for the tip, tilt, piston differences and wave propagation front curvatures of each sub-aperture.

In exemplary embodiments using a local reference interferometer, one beamlet is segregated as a local reference which is then provided as the local reference to the interferometer. Interfering the combined beamlet sample then includes combining the local reference with the combined beamlets on a focal plane array.

A second exemplary embodiment provides a method for combining optical beams wherein multiple incoherent beams are first combined by angle using carrier frequency tilt fringes. An illumination laser beam is reflected off a target or returned as backscatter. The returned illumination beam as perturbed by the path to the target is received and interference fringes are formed from the returned illumination beam on a focal plane array (FPA) in an interferometer. An FPA frame with L rows and N columns of data is read into a fringe processor. For each row, an n-pixel bucket having an odd number of pixels in column data points is placed in the row at the first column. A determination is made if the central point in the bucket is a local minima. If so, that pixel value is saved and its position in the row recorded. The bucket is then shifted by one pixel. The minima determination is repeated for each column in the row until all pixels in the row have been covered by the bucket. A blazed fringe for the single row is then created with A/m steps per fringe where m is the number of pixels between minima and A is the wavelength of the beam. The blazed fringe row is then transferred to a SLM. The minima determination and fringe blazing processes are repeated until all L rows in the FPA array are read and transferred to the SLM. The next FPA frame is then read into the fringe processor. The blazed fringes are then transferred to a spatial light modulator and a real time hologram is generated. The combined incoherent beams are then diffracted from the SLM hologram fringes and emitted to the far field with diffractive compensation for path perturbation of each sub-aperture.

In certain embodiments employing local referenced interferometer, a portion of the returned illumination beam is segregated as a local reference and provided to the interferometer. The interference fringes are then created combining the local reference. In certain embodiments, blazing of the fringes is employed.

The features, functions, and advantages that have been discussed can be achieved independently in various embodiments of the present invention or may be combined in yet other embodiments, further details of which can be seen with reference to the following description and drawings.

DETAILED DESCRIPTION

In a first form of exemplary embodiment, a real time holographic (RTH) grating provided on a spatial light modulator (SLM) can be used to correct for images viewed through the optical path by diffracting the distorted image off the hologram. In a second form of exemplary embodiment, the RTH grating can be used to pre-compensate laser beams for path distortions to the target resulting in smallest possible target spot size.

The embodiments described herein demonstrate a system for efficient and simple optical compensation or precompensation of laser beams. As exemplary constructions, beam combination of multiple laser sources such as solid state, fiber, etc. for directed energy, Lasercom and other applications are employed. As a first construction for optical compensation, multiple coherent optical beams are provided to a collimating lens which expands a plurality of coherent beamlets to an aperture. An interferometer receives a sample of a full aperture unphased combination of the plurality of beamlets and provides interference fringes, A SLM receives the fringes from the interferometer and generates a hologram as a diffraction grating. Relay optics transmit the full aperture unphased combined beamlets to the SLM and receive a diffraction corrected full aperture phased beam from the diffraction grating for emission to the far field as the corrected image. As a second construction, image or target illuminated light is imaged and relayed into a self- or local-referenced interferometer. Signal and reference legs are combined at a small tilt angle onto a focal plane array (FPA). Fringe contour changes from equally-spaced parallel beams contain phase information of the sampled optical path. Interference fringes are recorded by the FPA. Exemplary embodiments determine fringe positions created in the interferometer by sensing fringe minima with a sliding n-pixel bucket across a row of pixels then assume one wave between minima and generate a high optically efficient stepped blazed grating for transfer to an electrically addressed SLM for real time hologram beam projection or image compensation applications. Several laser sources may be combined using the interferometer generated hologram on the SLM to remove perturbations in the optical path and transmission path perturbations such as atmospheric interference between the laser and the target and provide a diffraction-limited full aperture far field intensity.

Figure 1:
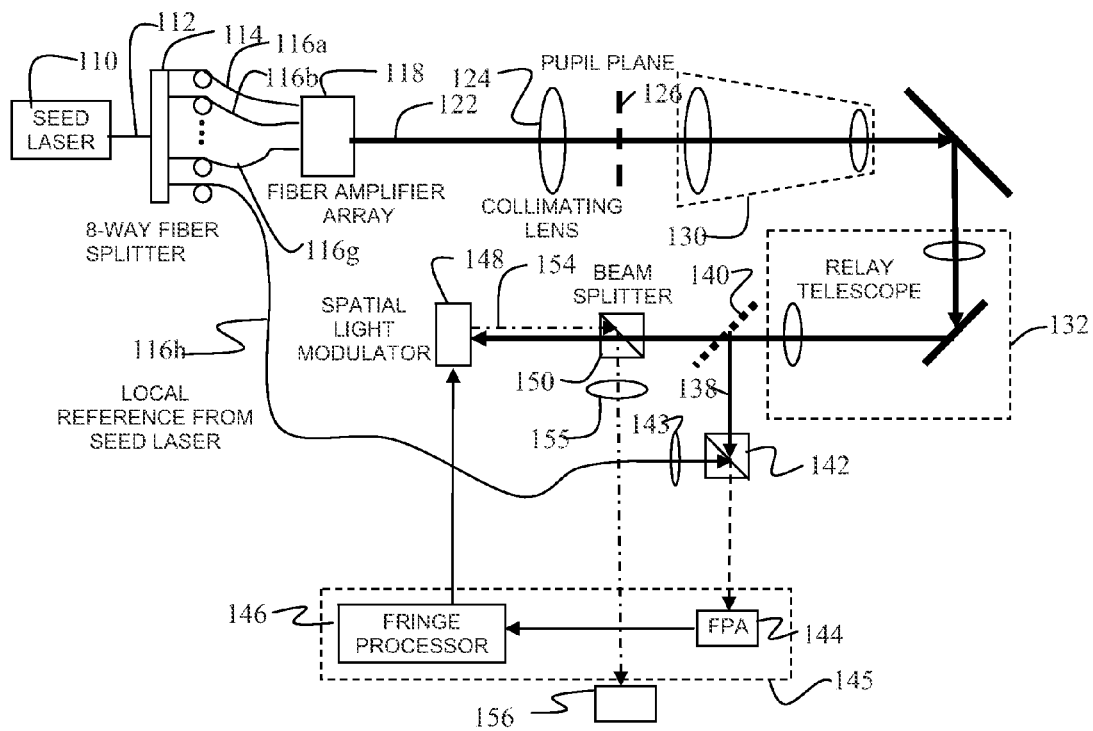
FIG. 1 is a block diagram of the elements of a first embodiment.

Referring to FIG. 1 for a first exemplary embodiment, a seed laser 110 provides a coherent beam 112 to a beam splitter 114. For various applications, the seed may be a laser source such as small laser diodes (single-frequency or gain-switched), short-cavity fiber lasers, and miniature solid-state lasers such as nonplanar ring oscillators (NPROs) or other lasers. For the embodiment shown, the beam splitter 114 is a fiber optic beam splitter and provides a 8-way split with seven coherent beams 116a 116g provided to a fiber amplifier array 118 with an eighth beam 116h employed as a local reference to be described in greater detail subsequently. In alternative embodiments, a splitter with smaller or larger split count or an entirely different structural approach for the seed laser may be employed. The combined non-phased full aperture laser beamlets 122 are routed through a collimating lens 124 resulting in a pupil plane 126. The seven amplified coherent beams or beamlets are allowed to propagate and spatially fill the pupil plane 126. The combined non-phased full aperture laser beamlets are reimaged through a demagnification telescope 130 and, in the relay optics for the embodiment shown, are internally passed by the beam control system through an optical train represented by relay telescope 132. A sample of the combined non-phased full aperture laser beamlets, represented by beam ray 138, constituting approximately 1% of the combined beam for the embodiment shown, is redirected as a sample leg by beam splitter 140 to combiner 142 where it is interfered with the reference eighth beam 116h, as originally split in the fiber splitter 114 and provided through relay lens 143, to form interference fringes. The interference pattern is received and the fringes and phase differences between the seed reference beam and the combined non-phased full aperture laser beamlets are recorded by a detector such as focal plane array (FPA) 144 in interferometer 145. The interference pattern is then processed by a fringe processor 146 which blazes and transfers the fringes updated at the FPA frame rate to a SLM 148. The main portion of combined non-phased full aperture laser beamlets passing through beam splitter 140 proceeds through beam splitter 150 to SLM 148. For the embodiment shown, beam splitter 150 is a polarizing beam splitter and the coherent beam source provides polarized lasers for this implementation. SLM 148 creates a real time hologram of the blazed grating provided by the fringe processor which diffracts the beamlets into the conjugate order as beam 154 for output to the far field as represented notionally by element 156.

Figure 2:
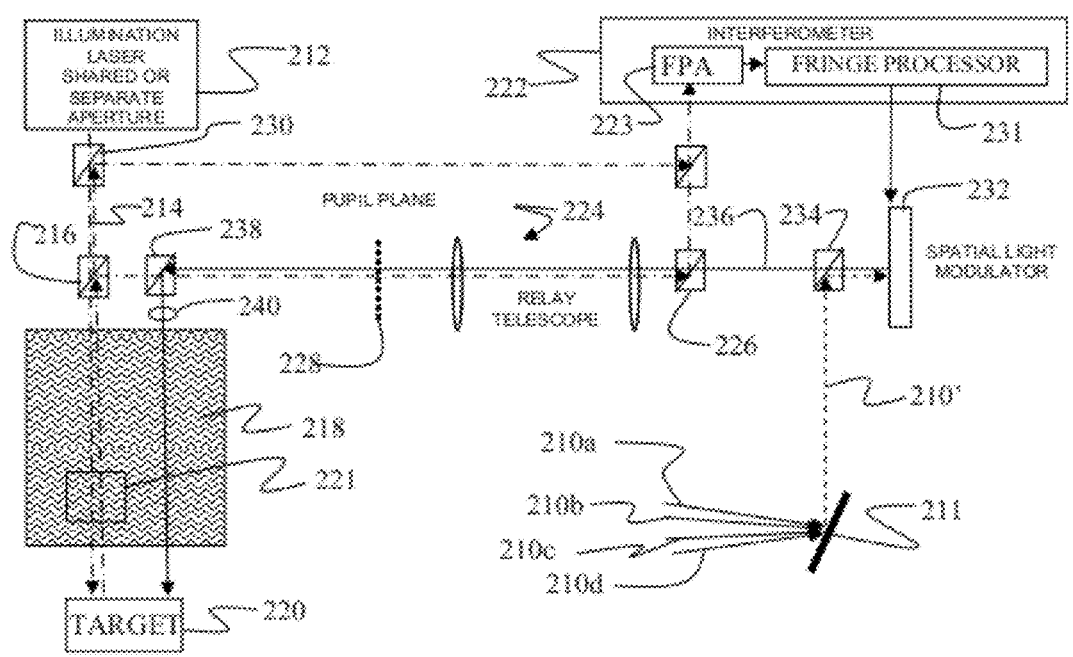
FIG. 2 is a block diagram of the elements of a second embodiment.

In a second exemplary embodiment shown in FIG. 2, an illumination laser 212 with a wavelength near the sub-aperture beam wavelengths provides a beam 214, which may be transmitted through a separate aperture 216 or a shared aperture with the ultimate beam output to be described subsequently, is perturbed by the atmosphere (represented by element 218) to and from the target 220. In alternative embodiments, the illumination laser may rely backscatter (conceptually represented by block 221), similar to a guide star laser, for return of atmospheric perturbations. An interferometer 222 having a focal plane array (FPA) 223 receives the returned illumination beam. For the embodiment shown in the drawing, the reflected illumination beam 214 transitions through relay optics for the system such as relay telescope 224 and beam splitter 226 additionally sampling any perturbations by the relay optics with respect to the pupil plane 228. The interferometer is self referenced with a portion of the reflected illumination beam segregated as a local reference by beam splitter 230 as shown in FIG. 2 in order to compensate for the optical path sampled by the return directed through the relay optics. The interferometer employs a fringe processor 231 to create fringes reflecting the perturbations acting on the illumination beam and provides a blazed conjugate order grid to SLM 232 for creation of a hologram. Transmission of the blazed fringes to the SLM at the FPA frame rate provides a real time hologram (RTH) as the adaptive optical elements for diffraction of the beam. The combined primary beam 210', formed from input beams 210a, 210b, 210c and 210d for the embodiment shown, which are to be corrected are directed by mirror 211 through beam splitter 234 to the SLM 232. SIM 232 presents the RTH of the blazed grating provided by interferometer 222 which diffracts the combined beams into conjugate order. The SLM effectively records the optical aberration with one wavelength of the illumination beam and the produced holographic grating compensates the primary beams with various wavelengths that fall inside the spectral bandwidth of the hologram. The beams are combined spectrally with the hologram. While the exemplary embodiment demonstrates spectral incoherent beam combining (beams 210a-d are different wavelengths), the blazing may be employed for all RTH applications. The corrected beam 236 is diffracted from the SLM 232 through beam splitter 234 into the relay optics including relay telescope 224 which transmit the beam through beam splitter 238 to output lens 240 as the output aperture. The individual laser beams each see a sub-aperture of the optical distortion which contains all of the phase information of the full aperture derived from the illumination beam and are therefore fully compensated and spatially overlapped at the target 20 without requirement for complex adaptive optics for each incoherent spectral beam.

For the exemplary embodiments as described with respect to FIGS. 1 and 2, the arms of the interferometers 145, 222 are slightly imbalanced to assure that there are always well defined minima. The imbalance may be optical or electronic (by the addition of noise) and only need be enough to assure that the minima remain above the noise floor of the FPA 144, 223. The FPA fringes are processed in the interferometer fringe processors 146, 231 by row at the FPA frame rate searching for minima using a sliding n-pixel bucket (n=3, 5, 7, etc.—odd number of pixels). Two adjacent fringe minima (separated by m-pixels) are assumed to define one wave fringe spacing. A blazed fringe of λ/m per step (pixel) is then generated between minima. This assures that the minima are well defined even in conditions of signal or reference leg power fluctuations. Fringes near edges are estimated from spacing of the first fringe (beginning of FPA row) or previous fringe (end of FPA row) for calculating the blazing to the respective edge to reduce loss in full aperture grating area. The fringes are then transferred and updated at the FPA frame rate to the SLM as a blazed grating for diffraction of the combined beams into the conjugate order.

Figure 3:
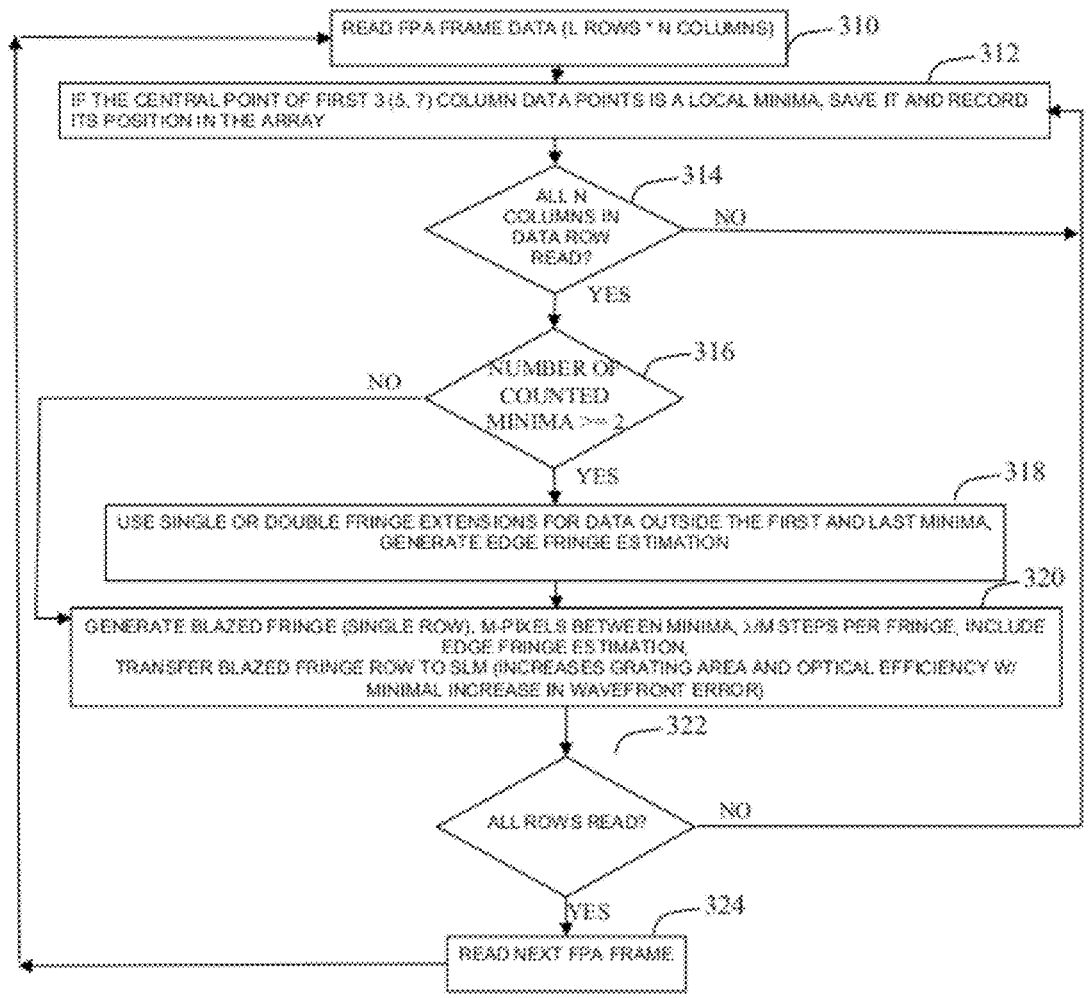
FIG. 3 is a flow chart of the minima determination and blazing process for the fringe processor.

Referring to FIG. 3, each FPA frame with L rows and N columns of data is read into the fringe processor, step 310. For each row, the fringe processor places an n-pixel bucket having an odd number of pixels (3, 5, 7 . . . ) in column data points in the row at the first column and determines if the central point in the bucket is a local minima and, if so, saves that pixel value and records its position in the row, step 312. The n-pixel bucket is then shifted by one pixel (column) and the minima determination is repeated for each column in the row until all pixels (columns) in the row have been covered by the bucket, step 314. If the number of counted minima exceeds two, step 316, edge minima estimation for applying blazing is accomplished by assuming that minima adjacent the edge is repeated, step 318. For certain embodiments an averaging of the two adjacent minima may be applied. A blazed fringe for the single row is then generated with A/m steps per fringe where m is the number of pixels between minima and A is the wavelength of the beam and the blazed fringe row is transferred to the SLM, step 320. The minima determination and fringe blazing processes are repeated until all L rows in the FPA array are read, step 322. The next FPA frame is then read into the fringe processor, step 324.

Figure 4:
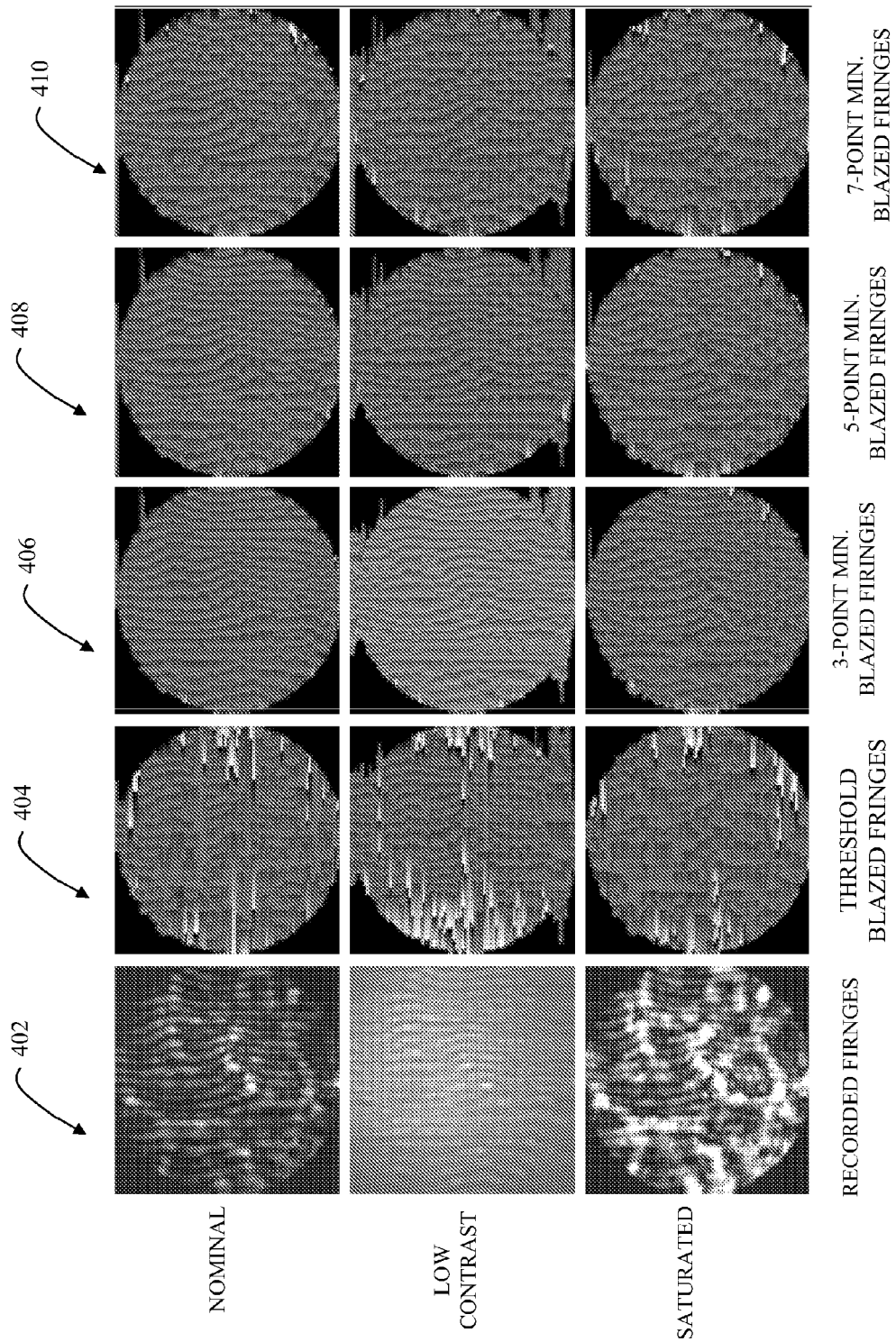
FIG. 4 is an array of images of exemplary focal plane array fringes with operation by conventional thresholding techniques and minimum detection techniques of the present embodiments.

Comparative examples of data for conventional threshold blazing and bucket minima determinations are shown in FIG. 4. Fringes recorded on the FPA for nominal, low contrast and saturated (high contrast) cases are shown in the leftmost column 402 of the figure. Blazed fringes for presentation on a SLM using the conventional threshold approach are shown in the second column 404 demonstrating the loss of data created by the non-optimized threshold determination. The three right columns demonstrate results of the present embodiments for pixel minima buckets of 3 pixels 406, 5 pixels 408 and 7 pixels 410. System performance (grating area) is improved by using a minimum intensity detection fringe blazing algorithm instead of a thresholding (maximum intensity) approach. For the thresholding approach, fringes below threshold are lost (loss of grating area), fringes well above threshold (saturated) merge together and also reduce grating area.

Figure 5:
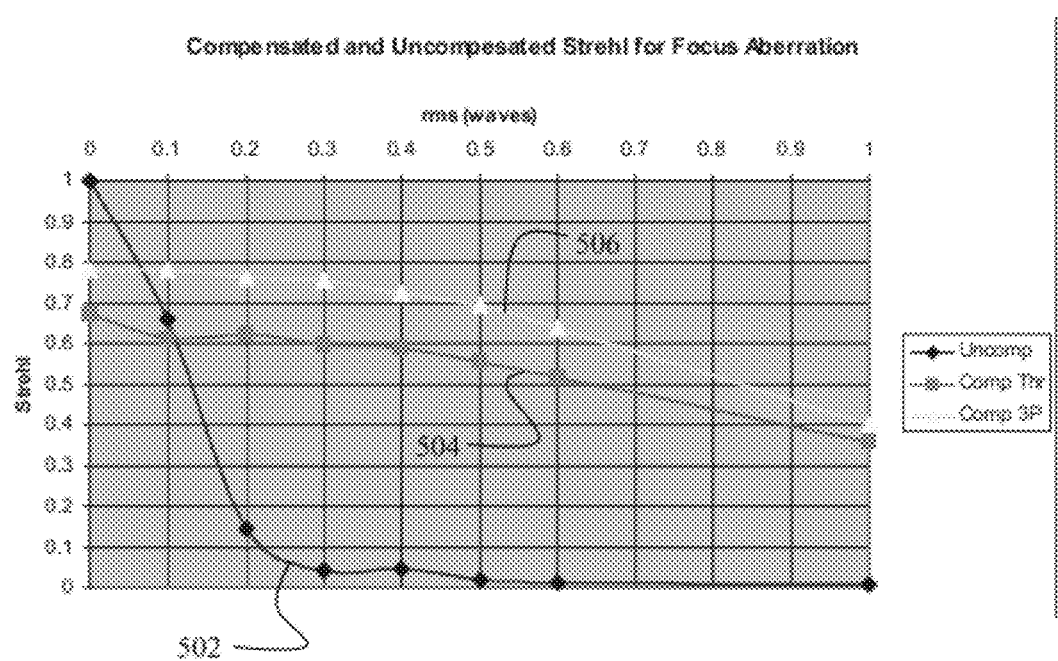
FIG. 5 is a chart of relative Strehl achieved for uncompensated, threshold compensation and 3-point minimum detection technique of the present embodiments.
Figure 6:
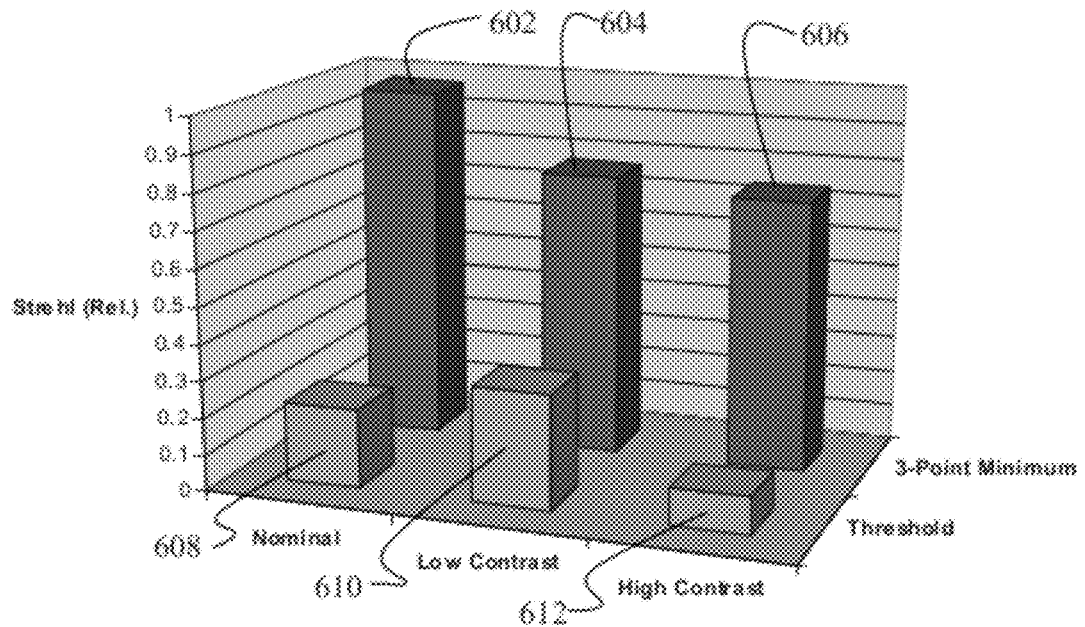
FIG. 6 is a block chart demonstrating relative sensitivity to contrast for a threshold compensation and 3-point minimum detection technique of the present embodiments.

Data representative of the far field Strehl resulting from compensation by the blazed gratings of FIG. 4 is shown in FIGS. 5 and 6. In FIG. 5, uncompensated Strehl is shown by trace 502. Trace 504 shows the relative improvement in Strehl using a threshold blazing technique. The minimum intensity detection of a 3 pixel bucket blazing is shown by trace 506 demonstrating the significant improvement over the threshold approach.

Similarly in FIG. 6, the relative compensation obtained by the 3 pixel bucket blazing for nominal, block 602, low contrast, block 604, and saturated (high contrast), block 606 demonstrate significantly less sensitivity to the varying contrast compared to the threshold compensation for nominal, block 608, low contrast, block 610 and saturated (high contrast), block 612.

Figure 7:
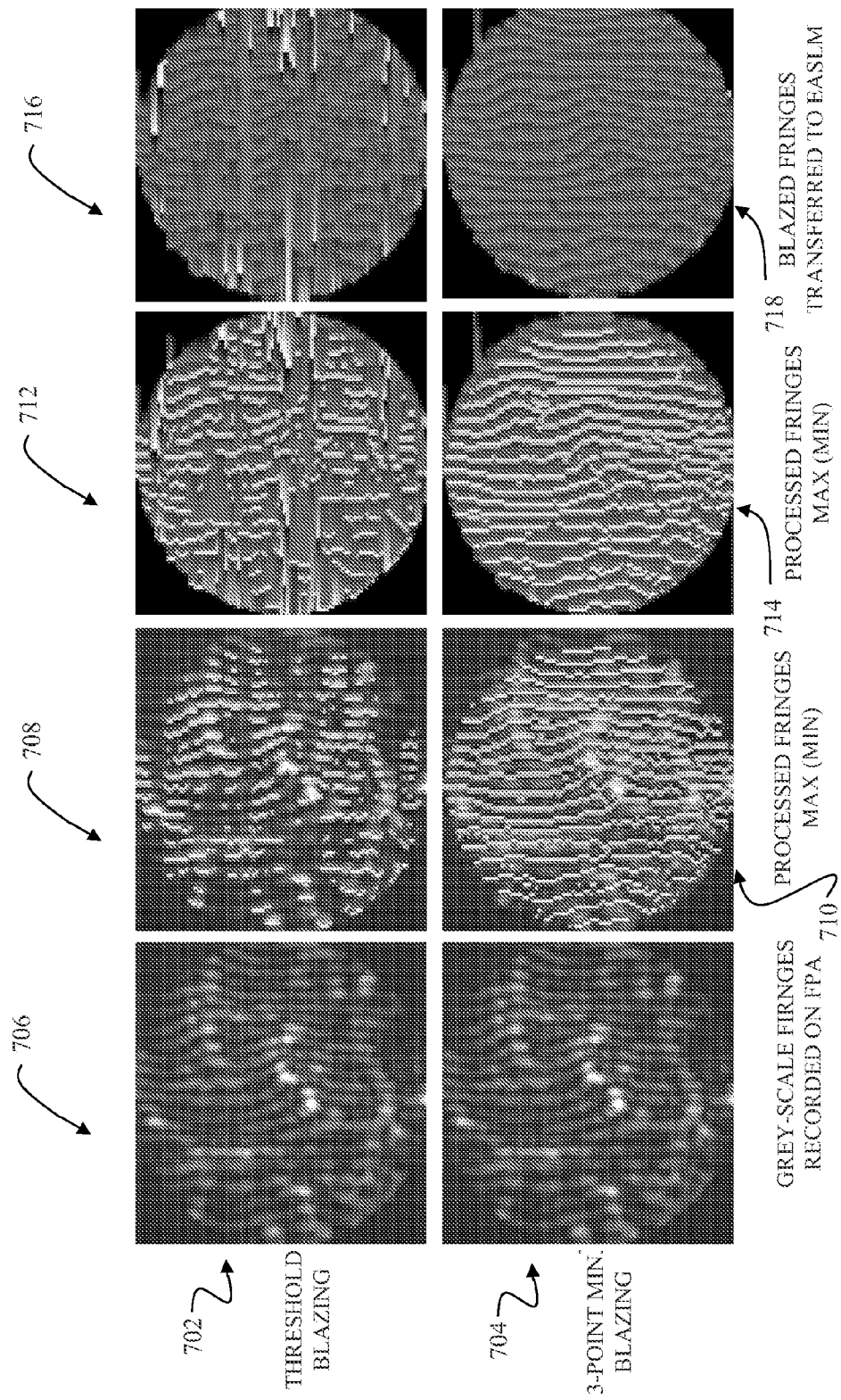
FIG. 7 is an array of images of threshold blazing in comparison to 3-point minimum blazing accomplished by the disclosed embodiments.

FIG. 7 shows exemplary images for threshold blazing in the top row 702 and 3-point minimum blazing in the lower row 704 for identical FPA frames (left column 706). The fringes as processed by an interferometer for the threshold technique 708 show significant losses compared to the fringes processed by a minimum detection technique 710. Reconstructed fringes for the threshold technique 712 still show significant losses compared to the fringes reconstructed by a minimum detection technique 714. The resulting blazing of the threshold technique 716 show significantly reduced RTH grating fidelity compared to the RTH grating blazed fringes processed by a minimum detection technique 718. Caption references in FIG. 7 for (min) refer to the present minimum detection technique while the "max" refers to results employing the thresholding technique where maxima are not as well defined due to intensity saturation or large contrast variations forcing a "guess" at the threshold intensity value.

The exemplary date demonstrates the capability of the embodiments disclosed to improve energy on target up to a factor of 20 while decreasing scintillation by greater than a factor of at least 3 and decreasing sensitivity to intensity fluctuations by up to a factor of 20.

Exemplary applications of beam correction as enabled by the embodiments disclosed include beam combination of moderate power lasers for high power application, telecommunication systems (Lasercom) and imaging systems.

Having now described various embodiments of the invention in detail as required by the patent statutes, those skilled in the art will recognize modifications and substitutions to the specific embodiments disclosed herein. Such modifications are within the scope and intent of the present disclosure as defined in the following claims.

What is claimed is:

1. A method for blazing of real time holographic fringes comprising:
    providing an interferometer with a focal plane array (FPA) to receive interference fringes;
    reading an FPA frame with L rows and N columns of data into a fringe processor;
    for each row, placing an n-pixel bucket having an odd number of pixels in column data points in the row at the first column;
    determining if a central point in the bucket is a local minima;
    saving that pixel value and recording its position in the row;
    shifting the bucket by one pixel;
    repeating the step of determining if the central point in the bucket is a local minima for each column in the row until all pixels in the row have been covered by the bucket;
    generating a blazed fringe between minima for the row;
    transferring the row to a spatial light modulator (SLM);
    repeating the step of determining if the central point in the bucket is a local minima for the row and the steps of generating a blazed fringe between minima and transferring the row to a spatial light modulator (SLM) until all L rows in the FPA are read;
    reading the next FPA frame into the fringe processor.

2. The method for blazing of real time holographic fringes as defined in claim 1 if the number of counted minima exceeds two further comprising estimating minima in an edge for applying blazing by assuming that minima adjacent the edge is repeated.

3. The method for blazing of real time holographic fringes as defined in claim 1 if the number of counted minima exceeds two further comprising estimating edge minima for applying blazing by applying averaging of two minima adjacent to the edge.

4. The method for blazing of real time holographic fringes as defined in claim 1 wherein the n-pixel bucket has a width of 3 pixels.

5. The method for blazing of real time holographic fringes as defined in claim 1 wherein the generating of the blazed fringe is accomplished with $\lambda/m$ steps per fringe where m is a number of pixels between minima and $\lambda$ is a wavelength of the beam.

6. The method for blazing of real time holographic fringes as defined in claim 1 wherein the step of providing an interferometer includes imbalancing aims of the interferometer such that the local minima remain above the noise floor of the FPA.

7. A method for combining multiple incoherent spectral optical beams comprising
    combining a plurality of incoherent spectral beams by angle using carrier frequency tilt fringes;
    reflecting an illumination laser beam in a beam path;
    receiving the reflected illumination beam as perturbed by the beam path;
    forming interference fringes with the illumination beam in an interferometer having a focal plane array (FPA);
    reading an FPA frame with L rows and N columns of data into a fringe processor;
    for each row, placing an n-pixel bucket having an odd number of pixels in column data points in the row at the first column;
    determining if a central point in the bucket is a local minima;
    saving that pixel value and recording its position in the row;
    shifting the bucket by one pixel;
    repeating the step of determining if the central point in the bucket is a local minima for each column in the row until all pixels in the row have been covered by the bucket;
    generating a blazed fringe for the row with $\lambda/m$ steps per fringe where m is a number of pixels between minima and $\lambda$ is a wavelength of the beam;
    transferring the row to a spatial light modulator (SLM);
    repeating the step of determining if the central point in the bucket is a local minima for the row and the steps of generating a blazed fringe between minima and transferring the row to a spatial light modulator (SLM) until all L rows in the FPA are read;
    reading the next FPA frame into the fringe processor
    transferring the blazed fringes to a spatial light modulator (SLM) and generating a real time hologram;
    diffracting the combined incoherent spectral beams from the real time hologram; and
    emitting the combined incoherent spectral beams to a far field with diffractive compensation for path perturbation.

8. The method of claim 7 further comprising:
    segregating a portion of the reflected illumination beam as a local reference;
    providing the local reference to the interferometer;

and wherein the step of forming interference fringes includes combining the local reference.

9. The method of claim 7 wherein emitting the combined incoherent spectral beams is accomplished through relay optics and further comprising:
transmitting the reflected illumination beam through the relay optics.

10. The method of claim 7 wherein the step of reflecting an illumination laser beam comprises reflecting the illumination beam off a target.

11. The method of claim 7 wherein the step of reflecting an illumination laser beam comprises receiving backscatter from the illumination beam.

12. A method for combining multiple coherent optical beams comprising:
propagating a plurality of coherent beamlets through a collimating lens to fill an aperture with an output of combined beamlets:
separating a sample of the output of combined beamlets to an interferometer;
interfering the sample to form interference fringes on a focal plane array (FPA);
reading an FPA frame with L rows and N columns of data into a fringe processor;
for each row, placing an n-pixel bucket having an odd number of pixels in column data points in the row at the first column;
determining if a central point in the bucket is a local minima;
saving that pixel value and recording its position in the row;
shifting the bucket by one pixel;
repeating the step of determining if the central point in the bucket is a local minima for each column in the row until all pixels in the row have been covered by the bucket;
generating a blazed fringe for the row with $\lambda/m$ steps per fringe where m is a number of pixels between minima and $\lambda$ is a wavelength of the beam;
transferring the row to a spatial light modulator (SLM);
repeating the step of determining if the central point in the bucket is a local minima, for the row and the steps of generating a blazed fringe between minima and transferring the row to a spatial light modulator (SLM) until all L rows in the FPA are read;
transferring the blazed fringes to a spatial light modulator (SLM) and generating a real time hologram;
diffracting the combined beamlets transmitted by relay optics from the SLM hologram fringes; and
emitting the combined beamlets to the far field with diffractive compensation for tip, tilt, piston differences and wave propagation front curvatures of each sub-aperture.

13. The method of claim 12 further comprising:
providing a seed laser;
receiving an input from the seed laser for a seed beam and splitting the seed beam into multiple beanlets;
increasing power of the individual beamlets using a fiber amplifier array.

14. The method of claim 13 further comprising:
segregating one beamlet as a local reference;
providing the local reference to the interferometer;
and wherein the step of interfering the sample includes combining the local reference with the output of combined beamlets on a focal plane array (FPA).

15. The method of claim 12 further comprising:
demagnifying to refocus and directing the output of combined beamlets through relay optics.

* * * * *

UNITED STATES PATENT AND TRADEMARK OFFICE
CERTIFICATE OF CORRECTION

PATENT NO. : 8,320,031 B1  
APPLICATION NO. : 12/635698  
DATED : November 27, 2012  
INVENTOR(S) : Daniel J. Sox et al.

It is certified that error appears in the above-identified patent and that said Letters Patent is hereby corrected as shown below:

Please amend the specification by inserting the following paragraph in column 1, lines 5-6 after the title:

--This invention was made with Government support under FA9451-08-D-0185 awarded by the United States Air Force. The Government has certain rights in the invention.--

Signed and Sealed this
Thirtieth Day of September, 2014

Michelle K. Lee
*Deputy Director of the United States Patent and Trademark Office*